United States Patent
Zhang et al.

(10) Patent No.: US 11,244,529 B2
(45) Date of Patent: Feb. 8, 2022

(54) METHODS AND APPARATUS FOR DETERMINING WAIT TIMES

(71) Applicant: Walmart Apollo, LLC, Bentonville, AR (US)

(72) Inventors: Shengyang Zhang, Santa Clara, CA (US); Mingang Fu, Palo Alto, CA (US); Arun Prasad Nagarathinam, Milpitas, CA (US); Apeksha Mehta, Mountain View, CA (US); Pawan Kumar, Sunnyvale, CA (US); Madhavan Kandhadai Vasantham, Dublin, CA (US); Ankit Jasuja, San Jose, CA (US); Surnaik Prakash Srivastava, Santa Clara, CA (US); Jennifer Chen, Union City, CA (US); Vidyanand Krishnan, Sunnyvale, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/666,109

(22) Filed: Oct. 28, 2019

(65) Prior Publication Data

US 2021/0125445 A1  Apr. 29, 2021

(51) Int. Cl.
*G07C 11/00* (2006.01)
*G06Q 10/06* (2012.01)
(Continued)

(52) U.S. Cl.
CPC ............. *G07C 11/00* (2013.01); *G06N 20/00* (2019.01); *G06Q 10/04* (2013.01); *G06Q 10/06* (2013.01);
(Continued)

(58) Field of Classification Search
CPC .... G06Q 10/04; G06Q 10/06; G06Q 10/0631; G06Q 10/063114; G07C 11/00; G07C 2011/04
(Continued)

(56) References Cited

U.S. PATENT DOCUMENTS

RE42,759 E      9/2011  Olewicz et al.
9,582,797 B1 *  2/2017  Holmes ............... H04B 1/3833
(Continued)

Primary Examiner — Suezu Ellis
(74) Attorney, Agent, or Firm — Duane Morris LLP; Manita Rawat

(57) ABSTRACT

A system is provided and generally includes a server, an associate computing device, and a customer computing device. The server may receive data from the customer computing device indicating that a customer is picking up items from a predetermined location. The server may compute an estimated wait time for the customer based on one or more machine learning processes. In some examples, a number of unexpected customers that may arrive is determined. The machine learning process may compute the estimated wait time based on the number of unexpected customers. The machine learning process may be trained with historical data. The estimated wait time is transmitted to the customer computing device, and is displayed to the customer. In some examples, the server sends a list of customers waiting to be serviced to the associate computing device. The list may be prioritized based on estimated wait times for those customers.

17 Claims, 7 Drawing Sheets

(51) Int. Cl.
   *G06Q 10/04*    (2012.01)
   *H04M 3/523*    (2006.01)
   *G06Q 30/00*    (2012.01)
   *G06N 20/00*    (2019.01)
   *G06Q 30/02*    (2012.01)

(52) U.S. Cl.
   CPC ........... *G06Q 30/016* (2013.01); *G06Q 30/02* (2013.01); *H04M 3/5238* (2013.01); *G07C 2011/04* (2013.01)

(58) Field of Classification Search
   USPC ........................................ 235/375, 377, 380
   See application file for complete search history.

(56) References Cited

U.S. PATENT DOCUMENTS

| | | |
|---|---|---|
| 9,870,555 B2 | 1/2018 | Morgan et al. |
| 9,946,999 B2 | 4/2018 | Morgan et al. |
| 2012/0143755 A1 | 6/2012 | Burrell |
| 2014/0180848 A1* | 6/2014 | Argue ..................... G07G 1/01 705/16 |
| 2015/0379434 A1* | 12/2015 | Argue .................. H04W 4/029 705/5 |
| 2018/0058872 A1* | 3/2018 | Berhe ................ G01C 21/3492 |
| 2018/0121993 A1* | 5/2018 | Agarwal ............ G06Q 30/0635 |
| 2018/0260863 A1 | 9/2018 | Leclercq et al. |
| 2020/0242553 A1* | 7/2020 | Zhang .............. G06Q 10/08355 |

\* cited by examiner

METHODS AND APPARATUS FOR DETERMINING WAIT TIMES

TECHNICAL FIELD

The disclosure relates generally to customer service and, more specifically, to apparatus and methods for determining customer wait times.

BACKGROUND

At least some known online retailers allow customers to place purchase orders remotely through a purchasing system. For example, some retailers use at least some known purchasing systems that allow customers to place purchase orders through the retailer's website. As another example, some retailers allow customers to place purchase orders through an application ("App") that executes on a mobile device, such as a cellular phone. Often times, the purchasing system provides an option to the customer to have the purchased items delivered to an address, such as to the customer's home address. At least some known purchasing systems, however, provide an option to allow the customer to pick up the purchased goods at a store location. For example, the customer can select a store location when making the purchase, and have the retailer gather the goods and have them ready for customer pickup. Some purchasing systems allow the customer to check-in ahead of time to let the retailer know the customer is on their way to pick up the purchased goods at a store location.

In some examples, when the customer arrives at the store, the customer parks their vehicle and walks into the store. The customer then proceeds to customer service to pick up their purchased goods. In other examples, the customer parks their vehicle at a designated parking area and waits for an associate to assist the customer with their order. These customer service experiences, however, have drawbacks. For example, the amount of time before an associate is ready to assist a customer may be substantially long. The customer may also be unaware of how long they must wait before the associate is ready to help them with their order. As such, there are opportunities to address these and other customer service experiences.

SUMMARY

In some embodiments, a system is provided that includes a first computing device communicatively coupled to a second computing device. The first computing device may be configured to receive first data identifying an arrival time window of a customer from the second computing device. The first computing device may also be configured to determine a current time based on the received first data. The first computing device may further be configured to determine a first number of customers waiting for service. The first computing device may be configured to determine a first number of associates available to assist the number of customers. The first computing device may also be configured to determine an expected wait time for the customer based on the current time, the first number of customers waiting for service, and the first number of associates available. Further, the first computing device may be configured to transmit the expected wait time to the second computing device.

In some embodiments, a method by a server includes receiving data identifying an arrival time window of a customer from the second computing device. The method may further include determining a current time based on the received first data. The method may also include determining a first number of customers waiting for service. The method may also include determining a first number of associates available to assist the number of customers. Further, the method may include determining an expected wait time for the customer based on the current time, the first number of customers waiting for service, and the first number of associates available. The method may also include transmitting the expected wait time to the second computing device.

In some embodiments, a non-transitory, computer-readable storage medium includes executable instructions that, when executed by one or more processors, cause the one or more processors to perform operations including receiving data identifying an arrival time window of a customer from the second computing device. The operations may further include determining a current time based on the received first data. The operations may also include determining a first number of customers waiting for service. The operations may also include determining a first number of associates available to assist the number of customers. Further, the operations may include determining an expected wait time for the customer based on the current time, the first number of customers waiting for service, and the first number of associates available. The operations may also include transmitting the expected wait time to the second computing device.

BRIEF DESCRIPTION OF THE DRAWINGS

The features and advantages of the present disclosures will be more fully disclosed in, or rendered obvious by, the following detailed descriptions of example embodiments. The detailed descriptions of the example embodiments are to be considered together with the accompanying drawings wherein like numbers refer to like parts and further wherein.

DETAILED DESCRIPTION

Figure 1:
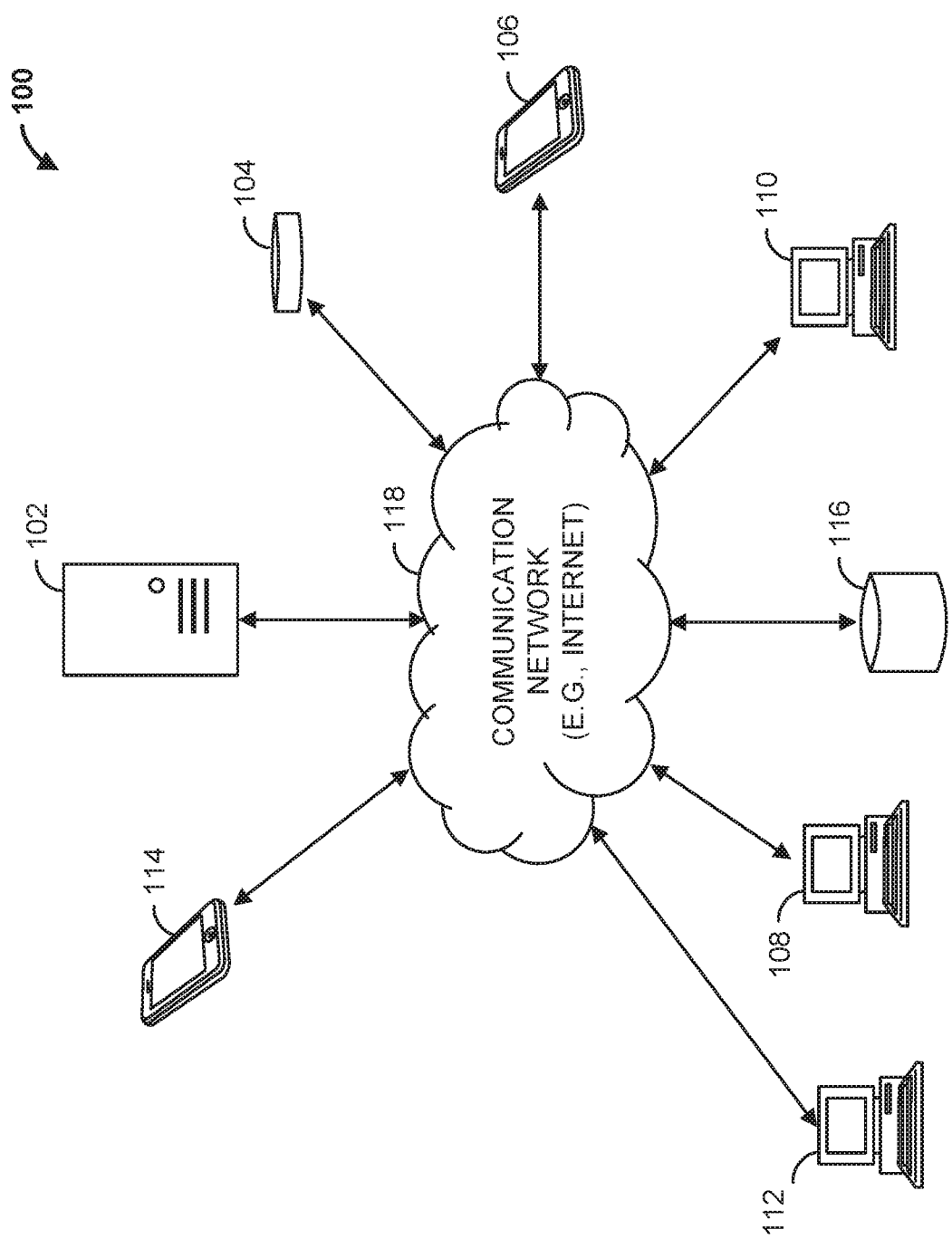
FIG. 1 is a block diagram of a wait time determination system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

The embodiments described herein may enable a retailer to determine estimated wait times for customers. The estimated wait time may be an amount of time the customer is estimated to wait from when the customer arrives at a pickup location (e.g., a store) to when an associate delivers purchased items to the customer, such as at their vehicle. For example, the embodiments may allow a retailer to determine an amount of time a customer may need to wait before an associate is able to bring out an order to the customer. In some examples, the embodiments may allow the reporting of the estimated wait time to the customer, such as via an application running on the customer's mobile device, or via a message (e.g., SMS message), for example.

In some examples, the embodiments may allow a retailer to determine when a customer is expected to arrive to pick up purchased items. For example, the embodiments may allow the retailer to determine when the customer is expected to arrive based on a preselected time window, or based on the tracking of a customer's mobile device (e.g., via Global Positioning System (GPS)). The embodiments may allow the retailer to determine the estimated wait time based on when the customer is expected to arrive to pick up the purchased items. As such, the embodiments may allow the retailer to provide a more efficient means for a customer to pick up purchased goods from a store. For example, the systems and methods described herein may advantageously assist customers and store personnel in completing transactions for outside-store pickup transactions by decreasing customer wait times.

Turning to the drawings, FIG. 1 illustrates a block diagram of a wait time determination system 100 that includes wait time determination server 102, multiple customer computing devices 104, 106, 108, multiple associate computing devices 110, 112, 114, and database 116, each operably connected to network 118. Wait time determination server 102, first customer computing device 104, second customer computing device 106, Nth customer computing device 108, first associate computing device 110, second associate computing device 112, and third associate computing device 114 can each be any suitable computing device that includes any hardware or hardware and software combination for processing data. In addition, each can transmit data to, and receive data from, network 118.

For example, each of wait time determination server 102, multiple customer computing devices 104, 106, 108, and multiple associate computing devices 110, 112, 114 can be a computer, a workstation, a laptop, a mobile device such as a cellular phone, a web server, an application server, a cloud-based server, or any other suitable device. Each can include, for example, one or more processors, one or more field-programmable gate arrays (FPGAs), one or more application-specific integrated circuits (ASICs), one or more state machines, digital circuitry, or any other suitable circuitry.

Although FIG. 1 illustrates three customer computing devices 104, 106, 108, wait time determination system 100 can include any number of customer computing devices 104,106, 108. Similarly, although FIG. 1 illustrates three associate computing devices 110, 112, 114, wait time determination system 100 can include any number of associate computing devices 110, 112, 114.

Wait time determination server 102 is operable to communicate with database 116 over network 118. For example, wait time determination server 102 can store data to, and read data from, database 116. Database 116 can be a remote storage device, such as a cloud-based server, a memory device on another application server, a networked computer, or any other suitable remote storage. Although shown remote to wait time determination server 102, in some examples database 116 can be a local storage device, such as a hard drive, a non-volatile memory, or a USB stick. For example, database 116 can be a storage device local to wait time determination server 102.

Network(s) 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Network 118 can provide access to, for example, the Internet.

Wait time determination server 102 can also communicate with first customer computing device 104, second customer computing device 106, and Nth customer computing device 108 over network 118. Similarly, first customer computing device 104, second customer computing device 106, and Nth customer computing device 108 are operable to communicate with wait time determination server 102 over network 118. For example, wait time determination server 102 can receive data (e.g., messages) from, and transmit data to, first customer computing device 104, second customer computing device 106, and Nth customer computing device 108.

Wait time determination server 102 is also operable to communicate with first associate computing device 110, second associate computing device 112, and Nth associate computing device 114. For example, wait time determination server 102 can receive data from, and transmit data to, first associate computing device 110, second associate computing device 112, and Nth associate computing device 114.

In some examples, wait time determination server 102 can be operated by a retailer, while associate computing devices 110, 112, 114 can be operated by associates (e.g., employees) of the retailer. In some examples, customer computing devices 104, 106, 108 can be operated by customers of the retailer.

Wait time determination system 100 may allow for the determination and notification of an amount of time a customer may have to wait to receive purchased goods when the customer's vehicle arrives at a predetermined location, such as a parking lot or an area outside a store designated for picking up purchased goods. As such, wait time determination system 100 may improve customer service experience notifying the customer of the expected wait time. In addition, wait time determination system 100 may reduce the amount of time customers may have to wait for purchased goods. For example, wait time determination system 100 may notify a retailer that a vehicle will be arriving at the predetermined location, thereby allowing the retailer to service the customer arriving in the vehicle as quickly as possible. For example, the associate may begin gathering the purchased goods for the customer before the customer has even arrived at the predetermined location.

In some examples, wait time determination server 102 is configured to determine customer wait times based on the application of one or more machine learning processes (e.g., algorithms). The machine learning processes may include a machine learning algorithm such as, but not limited to, a clustering algorithm or unsupervised learning algorithm (e.g., a k-means algorithm, a mixture model, a hierarchical clustering algorithm, etc.), a semi-supervised learning algorithm, or a decision-tree algorithm. In some examples, wait time determination server 102 employs a machine learning algorithm based on gradient boosting decision trees, such as XGBoost (e.g., XGBoost regressor), to determine customer wait times. The machine learning processes may be trained with historical data. The historical data may include, for example, previous actual wait times, a number of associates working during the wait times, special event data (e.g., special events that may have been taking place during the wait times), the number of customers picking up items during the wait times, the time of day during the wait times (e.g., a timeslot, such as 9-11 am, 11 am-1 pm, etc.), or any other relevant historic data.

Wait time determination server 102 may execute the trained one or more machine learning processes to determine an expected wait time for a particular customer. The expected wait time may then be transmitted to the customer. In some examples, a customer checks in via an application, such as an application executing on first customer computing device 104. The customer may check in before leaving a previous location (e.g., their home) to pick up the purchased goods. In response to the check in, first customer computing device 104 may transmit a notification to wait time determination server 102 indicating that the customer is on their way to pick up purchased goods at the predetermined location. Wait time determination server 102 may then determine an expected wait time based on execution of the one or more machine learning processes, and transmits the expected wait time to first customer computing devices 104.

In some examples, wait time determination server 102 receives geolocation data from first computing device 104 to determine an expected arrival time. Wait time determination server 102 may determine the expected wait time for the customer based on the expected arrival time. For example, the expected wait time may be an amount of time the customer may wait to receive purchased goods after the expected arrival time.

In some examples, the customer may check in when they arrive at the predetermined location. In other examples, a customer may arrive at the predetermined location, and notify an associate that they have arrived to pick up their purchased goods. In either example, wait time determination server 102 may determine the expected wait time for the customer based on their arrival time, such as the current time.

In some examples, wait time determination server 102 determines an amount of remaining time left for a customer to be serviced based on the determined expected wait times and a current time. For example, wait time determination server 102 may determine a last service time for the customer based on when the customer was notified of the expected wait time, and the expected wait time for the customer. If the customer was notified at 9:00 am that the wait time is 10 minutes, then the last service time is determined to be 9:10 am, for example. Wait time determination server 102 may then determine how much time is currently left before 9:10 am. For example, wait time determination server 102 may subtract 9:10 am from the current time to determine how much time is currently left before the last service time is reached. Wait time determination server 102 may determine a prioritized list of customers based on how much time is currently left before the last service time is reached for each customer. For example, wait time determination server 102 may prioritize customers with shorter remaining wait times (e.g., amount of time before the customer's corresponding last service time is reached) over customers with longer remaining wait times.

In some examples, wait time determination server 102 transmits a message to one or more of associate computing devices 110, 112, 114 indicating one or more of customer wait times, remaining wait times, and corresponding order data for each customer. The order data may indicate the items each customer is picking up. An associate operating the associate computing device 110, 112, 114 may prioritize customers based the information. For example, the associate may service a customer with a shorter remaining wait time (or, in some examples, a customer with a remaining wait time that has lapsed) before the associate services a customer with a respective longer remaining wait time. In some examples, associate computing devices 110, 112, 114 display the remaining wait times for each customer. In some examples, customers with shorter (or lapsed) remaining wait times are displayed ahead of customers with respective longer remaining wait times.

Figure 2:
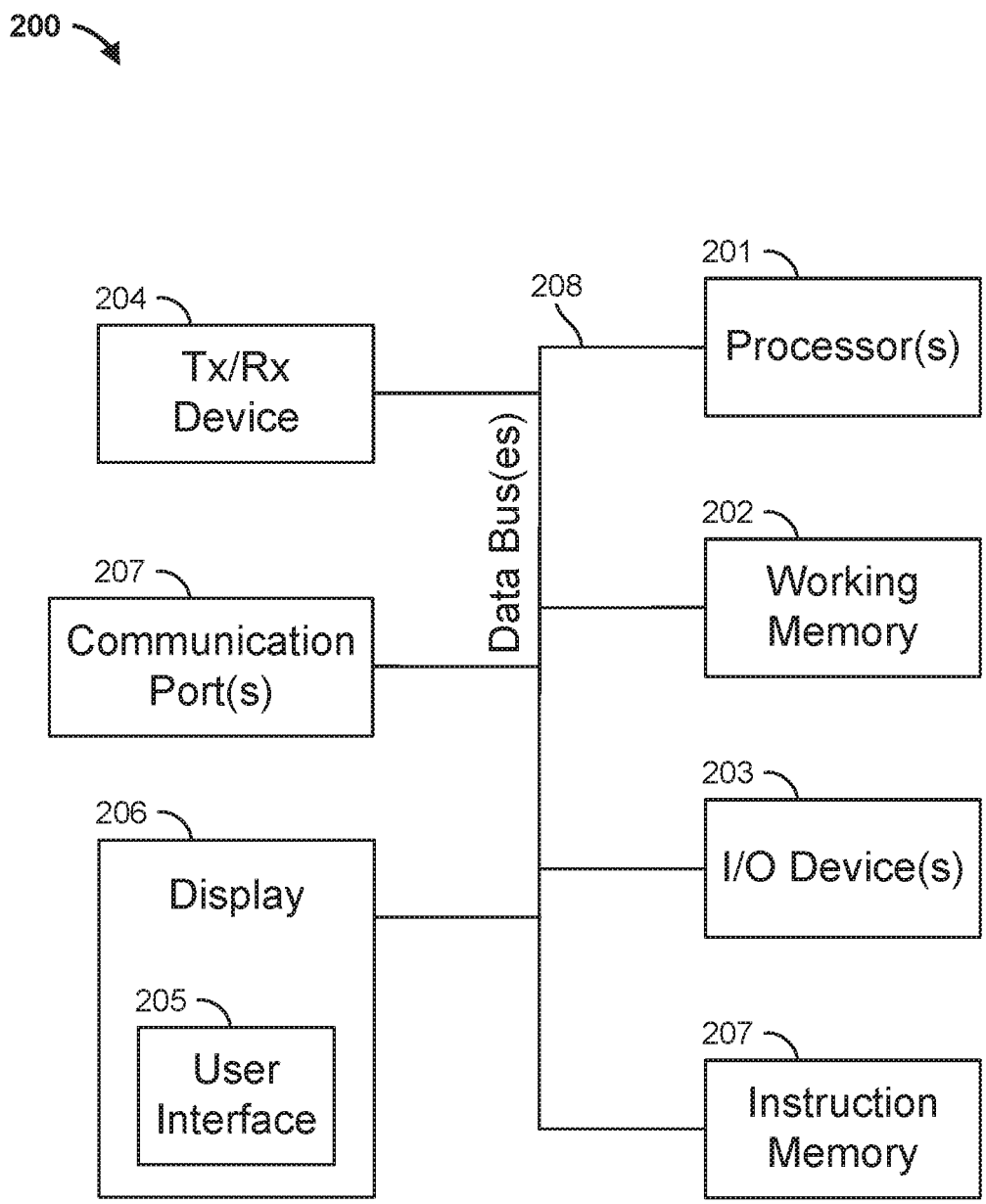
FIG. 2 is a block diagram of the wait time determination server of the system of FIG. 1 in accordance with some embodiments.

FIG. 2 illustrates a more detailed view of the wait time determination server 102 of FIG. 1. Wait time determination server 102 can include one or more processors 201, working memory 202, one or more input/output devices 203, instruction memory 207, communication port 210, transceiver 204, and a display 206, all operatively coupled to one or more data buses 208. Data buses 208 allow for communication among the various devices. Data buses 208 can include wired, or wireless, communication channels.

Processor(s) 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processor(s) 201 are configured to perform a certain function or operation by executing code, stored on instruction memory 207, embodying the function or operation. For example, processor(s) 201 can be configured to perform one or more of any function, method, or operation disclosed herein.

Instruction memory 207 can store instructions that can be accessed (e.g., read) and executed by processor(s) 201. For example, instruction memory 207 can include read-only memory (ROM) such as electrically erasable programmable read-only memory (EEPROM), flash memory, a removable disk, CD-ROM, any non-volatile memory, or any other suitable memory.

Processor(s) 201 can store data to, and read data from, working memory 202. For example, processor(s) 201 can store a working set of instructions to working memory 202, such as instructions loaded from instruction memory 207. Processor(s) 201 can also use working memory 202 to store dynamic data created during the operation of wait time determination server 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 210 can include, for example, a serial port such as a universal asynchronous receiver/transmitter (UART) connection, a Universal Serial Bus (USB) connection, or any other suitable communication port or connection. In some examples, communication port(s) 210 allows for the programming of executable instructions in instruction memory 207. In some examples, communication port(s) 210 allow for the transfer (e.g., uploading or downloading) of data, such as machine learning algorithm training data.

Display 206 can display user interface 205. User interface 205 can enable user interaction with wait time determination server 102. In some examples, a user can interact with user interface 205 by engaging input-output devices 203. Display 206 can be any suitable display. For example, display 206 can be a computer monitor. In some examples, display 206 includes a touchscreen.

Transceiver 204 allows for communication with a network, such as a network of network(s) 118 of FIG. 1. In some examples, transceiver 204 is selected based on the type of network(s) 118 wait time determination server 102 will be operating in. For example, transceiver 204 can allow for communications with a WiFi® network in the example when network 118 is a WiFi® network. Processor(s) 201 is operable to receive data from, or send data to, network 118 via transceiver 204.

Figure 3:
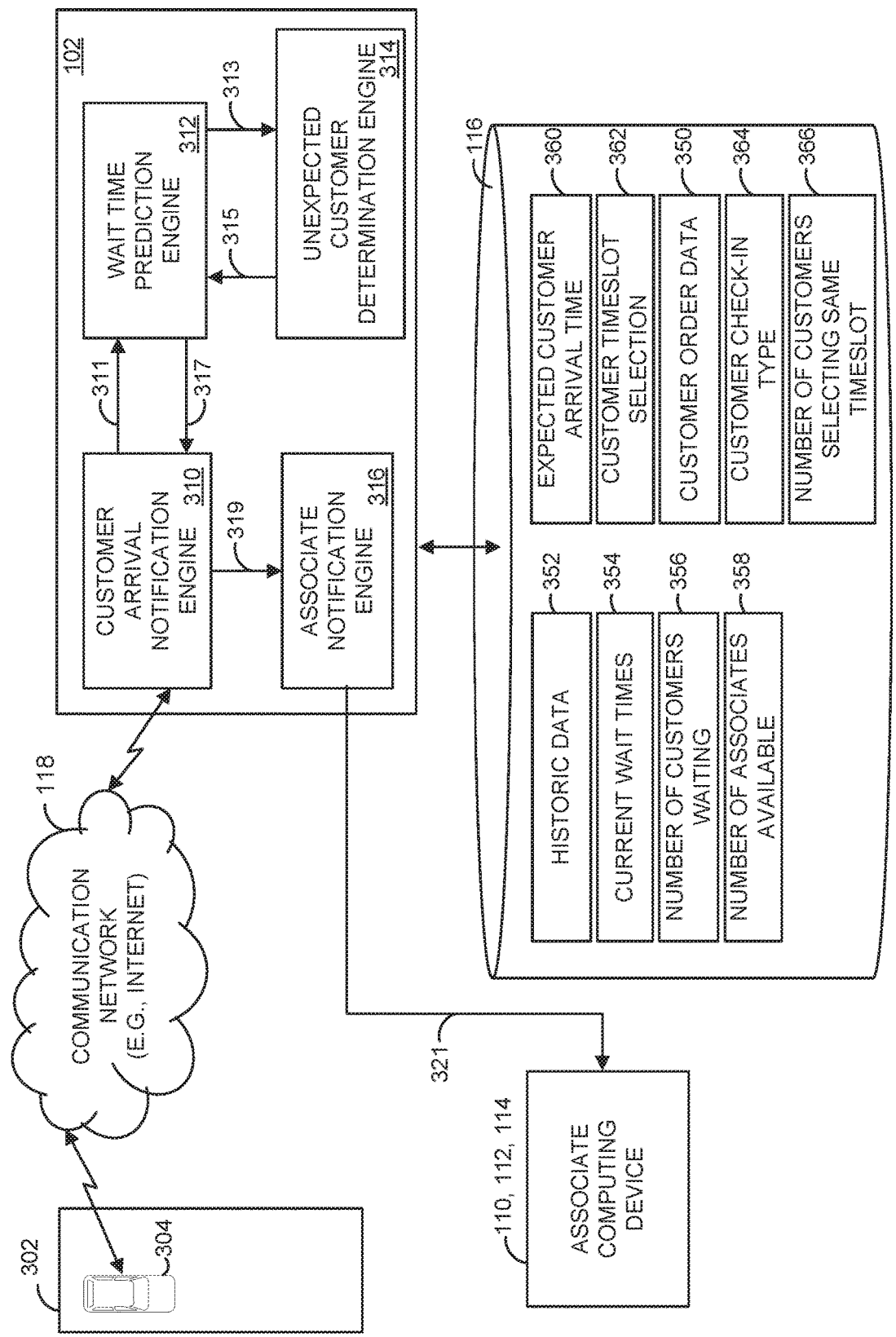
FIG. 3 is block diagram illustrating various portions of the wait time determination system of FIG. 1 in accordance with some embodiments.

FIG. 3 illustrates a block diagram illustrating various portions of the wait time determination system 100 of FIG. 1. In this example, a vehicle 304 operated by a customer is illustrated at location 302. Location 302 may be, for example, a pre-defined location, such as a portion of a retailer's parking lot where customers park their vehicles to await delivery of previously ordered items. For example, the items may have been ordered on the retailer's website, and the customer may have selected to pick the items up at the retailer's location. Although not illustrated, the customer, inside vehicle 304, is operating one or more of multiple customer computing devices 104, 106, 108. Customer computing devices 104, 106, 108 can communicate with vehicle wait time determination server 102 over network 118.

As indicated in the figure, wait time determination server 102 includes customer arrival notification engine 310, wait time prediction engine 312, unexpected customer determination engine 314, and associate notification engine 316. In some examples, some or all of the functions of customer arrival notification engine 310, wait time prediction engine 312, unexpected customer determination engine 314, and associate notification engine 316 are implemented in executable instructions executed by processor(s) 201. In some examples, some or all of the functions of customer arrival notification engine 310, wait time prediction engine 312, unexpected customer determination engine 314, and associate notification engine 316 can be implemented in hardware, such as digital circuitry, FPGAs, ASICs, state machines, or any other suitable hardware.

Customer arrival notification engine 310 is operable to receive a message from customer computing device 104, 106, 108 indicating that a customer has arrived at location 302. For example, customer computing device 104, 106, 108 may execute an application that allows the customer to "check-in" when the customer arrives at location 302. Upon checking in, customer computing device 104, 106, 108 transmits a customer arrival message to customer arrival notification engine 310 indicating that the customer has arrived at location 302. Upon receiving the customer arrival message, customer arrival notification engine 310 may identify the customer, and the purchased goods the customer is to receive. For example, the customer arrival message may indicate a customer identification (ID), a customer order ID, or any other customer identifying data. Based on the received customer ID or customer order number, customer arrival notification engine 310 may determine the order for the customer. For example, customer arrival notification engine 310 may obtain customer order data 350 from database 116, which identifies the order for the customer.

In some examples, the customer may "check-in" when leaving a current location. For example, the customer may "check-in" when leaving their home. In this example, upon checking in, customer computing device 104, 106, 108 transmits a customer leaving message to customer arrival notification engine 310 indicating that the customer is on their way to pick up purchased goods from location 302. Customer arrival notification engine 310 may obtain geolocation information (e.g., latitude and longitude data) from customer computing device 104, 106, 108 indicating a location of customer computing device 104, 106, 108. For example, the application executing on customer computing device 104, 106, 108 may occasionally (e.g., periodically) transmit geolocation data to customer arrival notification engine 310.

Upon receiving the customer leaving message, customer arrival notification engine 310 may identify the customer, and the purchased goods the customer is to receive. For example, the customer leaving message may indicate a customer ID, or a customer order number. Based on the received customer ID or customer order number, customer arrival notification engine 310 may determine the order for the customer. For example, customer arrival notification engine 310 may obtain customer order data 350 from database 116, which identifies the order for the customer.

Customer arrival notification engine 310 generates customer arrival data 311 identifying the customer and whether the customer has arrived at location 302, or whether the customer is on their way to location 302. Customer arrival notification engine 310 provides customer arrival data 311 to wait time prediction engine 312.

Customer arrival notification engine 310 may, in some examples, determine an expected arrival time based on the received geolocation data. For example, customer arrival notification engine 310 may determine an expected arrival time at location 302 based on traffic patterns, and available routes from a current location of customer computing device 104, 106, 108 to location 302. Customer arrival notification engine 310 may store the expected arrival time in database 116 as expected customer arrival time 360.

In some examples, customer arrival notification engine 310 generates customer check-in type 364 indicating whether the customer checked in via, for example the application executing on customer computing device 104, 106, 108, or whether the customer arrived at location 302 and notified an associate that they have arrived. For example, if a customer were to arrive at location 302 and has not checked in via the application, the customer may inform an associate that they have arrived to pick up purchased goods. The associate may cause associate computing device 110, 112, 114 (e.g., via the application) to transmit a message to customer arrival notification engine 310 indicating the customer has arrived at location 302 (e.g., and has not checked in via the application). Customer arrival notification engine 310 may store customer check-in type 364 in database 116.

In some examples, a customer may, via the application, select a timeslot during which the customer will arrive at location 302 to pick up an order. For example, the application may allow the customer to pick up the purchased goods during two-hour timeslots (e.g., windows). Customer computing device 104, 106, 108 may transmit a customer pickup schedule message to customer arrival notification engine 310 indicating the timeslot. Customer arrival notification engine 310 may store the customer timeslot selection 362 identifying the timeslot for the customer in database 116.

Wait time prediction engine 312 may apply one or more machine learning processes to customer arrival data 311 to determine an expected wait time. In some examples, wait time determination server 102 employs a machine learning algorithm based on XGBoost regressor to determine an expected wait time. The machine learning algorithm may be trained with historic data 352. Historic data 352 may identify, for example, historic wait times. The historic wait times can include actual wait times for a same store on the same day over a previous period of time, such as last week, last month, last year, etc. The historic wait times may also identify actual wait times for a current period of time, such as this week, this month, etc.

In some examples, historic data 352 can include a number of associates working during the actual wait times, special event data (e.g., special events that may have been taking place during the wait times), a number of customers picking up items during the actual wait times, and the time of day (or timeslot) during the actual wait times.

The machine learning algorithm may operate on customer arrival data 311 to determine an expected wait time for the customer. For example, based on a current time associated with customer arrival data 311, wait time prediction engine 312 may determine an expected wait time for the customer based on execution of the machine learning algorithm. In some examples, the machine learning algorithm also operates on one or more of the following: current wait times 354, number of customers waiting 356, and number of associates available 358. Current wait times 354 may identify, for example, wait times for the current day. Number of customers waiting 356 may identify the number of customers currently waiting to be serviced by an associate. Number of associates available 358 may identify the number of associates available to assist customers, such as the number of associates available to assist customers when the customer arrives at location 302.

In some examples, the machine learning algorithm may, additionally or alternatively, operate on expected customer arrival time 360. For example, wait time prediction engine 312 may provide the machine learning algorithm with expected customer arrival time 360, which identifies an expected arrival time at location 302 for the customer. Wait time prediction engine 312 may provide expected customer arrival time 360 to the machine learning algorithm to determine an expected wait time during the expected arrival time.

In some examples, the machine learning algorithm may, additionally or alternatively, operate on customer check-in type 364. Customer check-in type 364 identifies whether the customer checked in via, for example the application executing on customer computing device 104, 106, 108, or whether the customer arrived at location 302 and notified an associate that they have arrived. Wait time prediction engine 312 may provide customer check-in type 364 to the machine learning algorithm to determine an expected wait time for the customer.

In some example, the machine learning algorithm may, additionally or alternatively, operate on customer timeslot selection 362. For example, wait time prediction engine 312 may provide customer timeslot selection 362 to the machine learning algorithm to determine an expected wait time during the selected timeslot.

In some examples, wait time prediction engine 312 determines a number of customers selecting a same timeslot. For example, wait time prediction engine 312 may determine how many customer timeslot selections 362 there are for a timeslot. Wait time prediction engine 312 may generate data identifying a number of customers selecting same timeslot 366, and store the data in database 116. In some examples, wait time prediction engine 312 provides number of customers selecting same timeslot 366 to the machine learning algorithm to determine an expected wait time during the timeslot for a customer.

As noted above, in some examples, customers may arrive at location 302 and check-in via the application once the customer has arrived. In other examples, a customer may not check in at all via the application and may instead inform an associate that they have arrived at location 302 to receive an order. These are examples of customers arriving unexpectedly to receive orders. Unexpected customer determination engine 314 may determine a number of unexpected customers, such as a number of unexpected customers during a timeslot. For example, wait time prediction engine 312 may provide a time data 313 identifying, for example, a timeslot, a time of day, or a date, for example. Unexpected customer determination engine 314 may execute one or more algorithms based on one or more rules to determine an estimated number of unexpected customers arriving during the requested time. The algorithms may be based on historical data, such as data identifying numbers of unexpected customers during similar previous periods of time (e.g., same timeslot for a same day last week or last month), for example.

In some examples, unexpected customer determination engine 314 employs one or more machine learning algorithms to determine the number of unexpected customers arriving during the requested time. The machine learning algorithm may be based, for example, on XGBoost regression. The machine learning algorithm may be trained with historical data.

Unexpected customer determination engine 314 may generate unexpected customers data 315 identifying an estimated number of unexpected customers during the time indicated by time data 313, and may provide unexpected customers data 315 to wait time prediction engine 312. Wait time prediction engine 312 may provide customers data 315 to the machine learning algorithm to determine an expected wait time during the time indicated by time data 313.

Wait time prediction engine 312 may generate expected wait time data 317 (e.g., as determined by executing one or more machine learning processes), and may provide expected wait time data 317 to customer arrival notification engine 310. Customer arrival notification engine 310 may include expected wait time data 317 in a customer response message, and provide the customer response message to customer computing device 104, 106, 108 (via, e.g., network 118).

Figure 4:
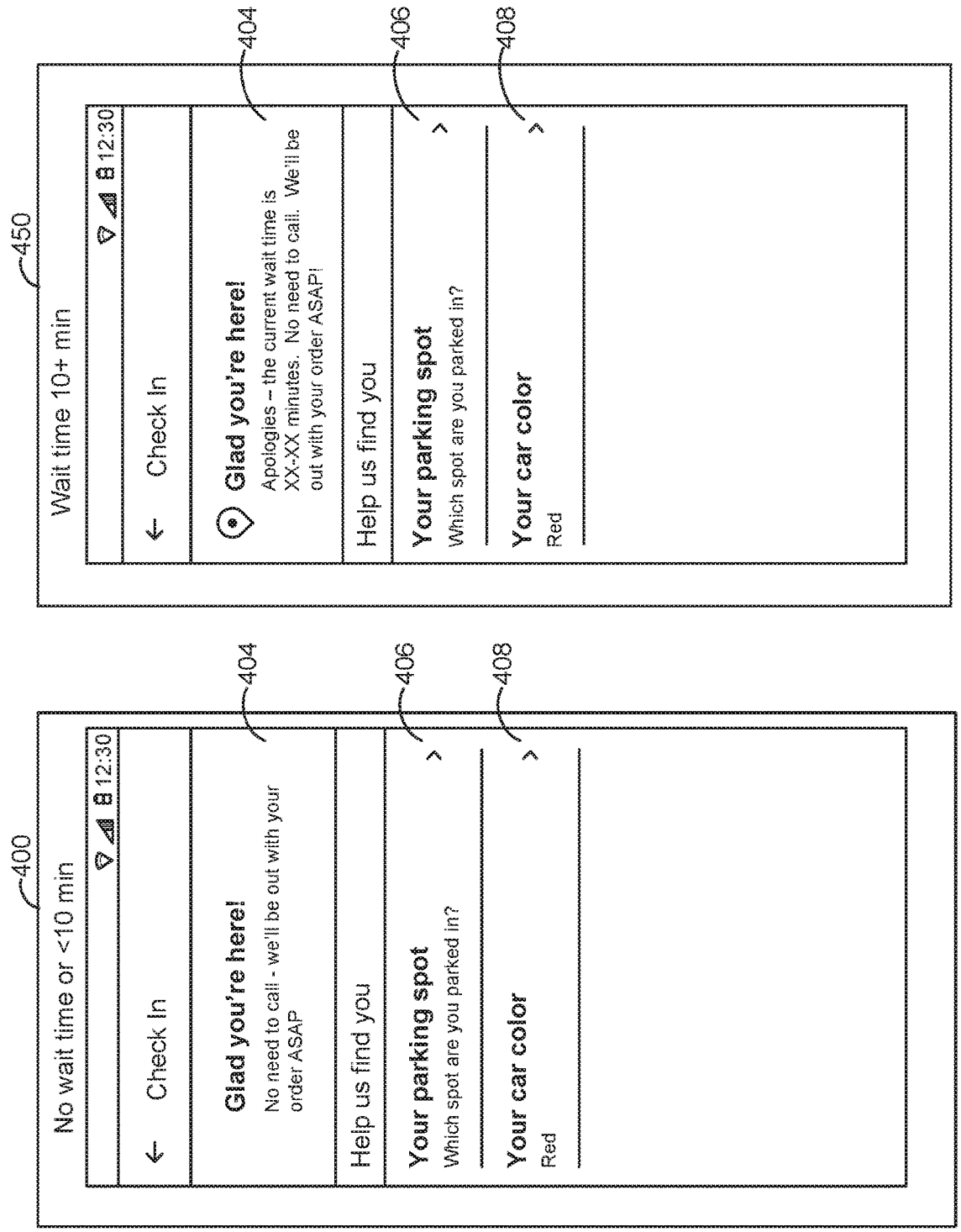
FIGS. 4A and 4B illustrate screens of a wait time determination application in accordance with some embodiments.

FIG. 4A illustrates an example of a screen (e.g., page) 400 of a wait time determination application that may execute on customer computing device 104, 106, 108. Screen 400 may be displayed, for example, upon the receiving of the customer response message from customer arrival notification engine 310 indicating the wait time. Screen 400 is an example of a screen that may be displayed if the indicated wait time is less than a threshold, such as 10 minutes. For example, if the wait time indicated by the customer response message is less than the threshold, the application may cause screen 400 to display. Screen 400 includes a wait time estimation window 404. In this example, wait time estimation window 404 indicates that the associate will be out with the order as soon as possible (ASAP).

FIG. 4B illustrates an example of a screen 450 of the same wait time determination application. In this example, screen 450 may be displayed if the wait time indicated by the customer response message is at or beyond the threshold. Here, wait time estimation window 404 indicates that the associate will be out in a number of minutes (e.g., as indicated by customer response message).

Each of screens 400 and 450 allow the customer to provide a parking location (e.g., a parking location number, a parking spot) in a parking location window 406. The provided parking location indicates where in location 302 the customer is parked. In addition, each of screens 400 and 450 allow the customer to provide the color of their vehicle in a vehicle color window 408. The parking location and the color of the car may assist an associate in locating the car for the delivery of purchased goods to the customer.

For example, and referring back to FIG. 3, upon entering in the parking location and the vehicle color, customer computing device 104, 106, 108 may transmit a customer waiting message to customer arrival notification engine 310. The customer waiting message may indicate the parking location and the vehicle color entered by the customer. Customer arrival notification engine 310 may parse the customer waiting message to extract the parking location and the vehicle color, and generate customer vehicle data 319 identifying the parking location and the vehicle color.

In some examples, customer arrival notification engine 310 includes the expected wait time determined for the customer by wait time prediction engine 312 (e.g., as identified by expected wait time data 317). In some examples, customer arrival notification engine 310 includes a customer ID and an order ID for the customer in customer vehicle data 219. Customer arrival notification engine 310 may provide customer vehicle data 319 to associate notification engine 316. Associate notification engine 316 is operable to transmit customer vehicle data 319 to one or more of associate computing device 110, 112, 114. An associate may then deliver the purchased goods to the customer.

Figure 5:
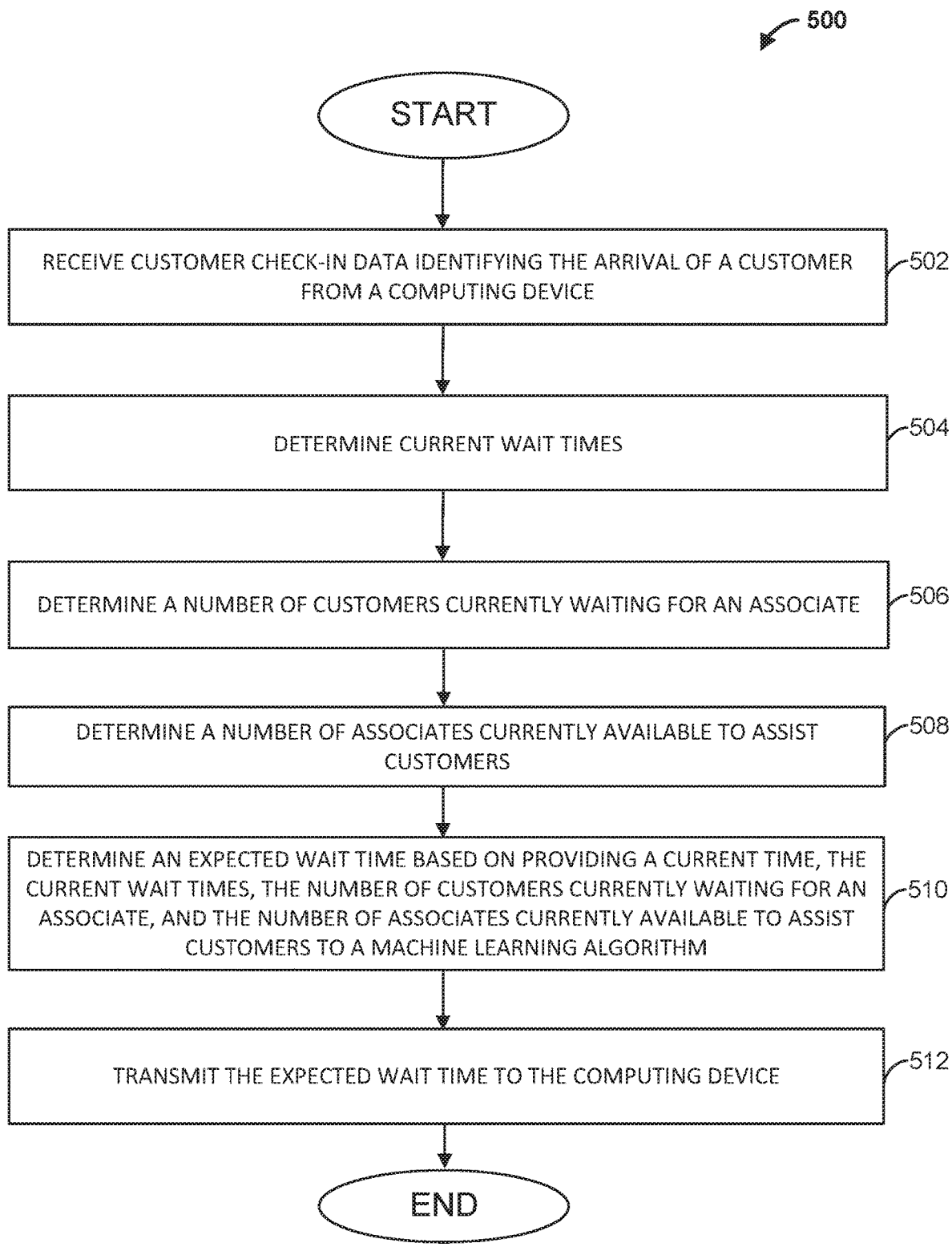
FIG. 5 is a flowchart of an example method that can be carried out by the wait time determination server of FIG. 1 in accordance with some embodiments.

FIG. 5 is a flowchart of an example method 500 that can be carried out by a server, such as wait time determination server 102 of FIG. 1. Beginning at step 502, customer check-in data is received from a computing device. The check-in data identifies the arrival of a customer. For example, a customer may cause, via an application, customer computing device 104, 106, 108 to transmit a customer arrival message to wait time determination server 102 indicating that the customer has arrived at location 302. At step 504, in response to the customer arrival message, current wait times are determined. For example, current wait times 354 may be obtained from database 116. Current wait times 354 may identify an average wait time for a current timeslot, for example. At step 506, a number of customers currently waiting for an associate to deliver them bought items is determined. For example, number of customers waiting 356 may be obtained from database 116.

Proceeding to step 508, a number of associates available to assist customers is determined. For example, number of associates available 358 may be obtained from database 116. The number of associates available 358 may be determined based on a number of associates that have checked in to work, for example.

At step 510, an expected wait time for the customer is determined. The expected wait time is determined based on executing at least one machine learning algorithm. The at least one machine learning algorithm operates on a current time, the current wait times, the number of customers currently waiting for an associate, and the number of available associates. For example, the current time, the current wait times, the number of customers currently waiting for an associate, and the number of available associates are provided as inputs to the machine learning algorithm, which may be based on XGBoost. At step 512, the expected wait time is transmitted to the computing device of the customer.

Figure 6:
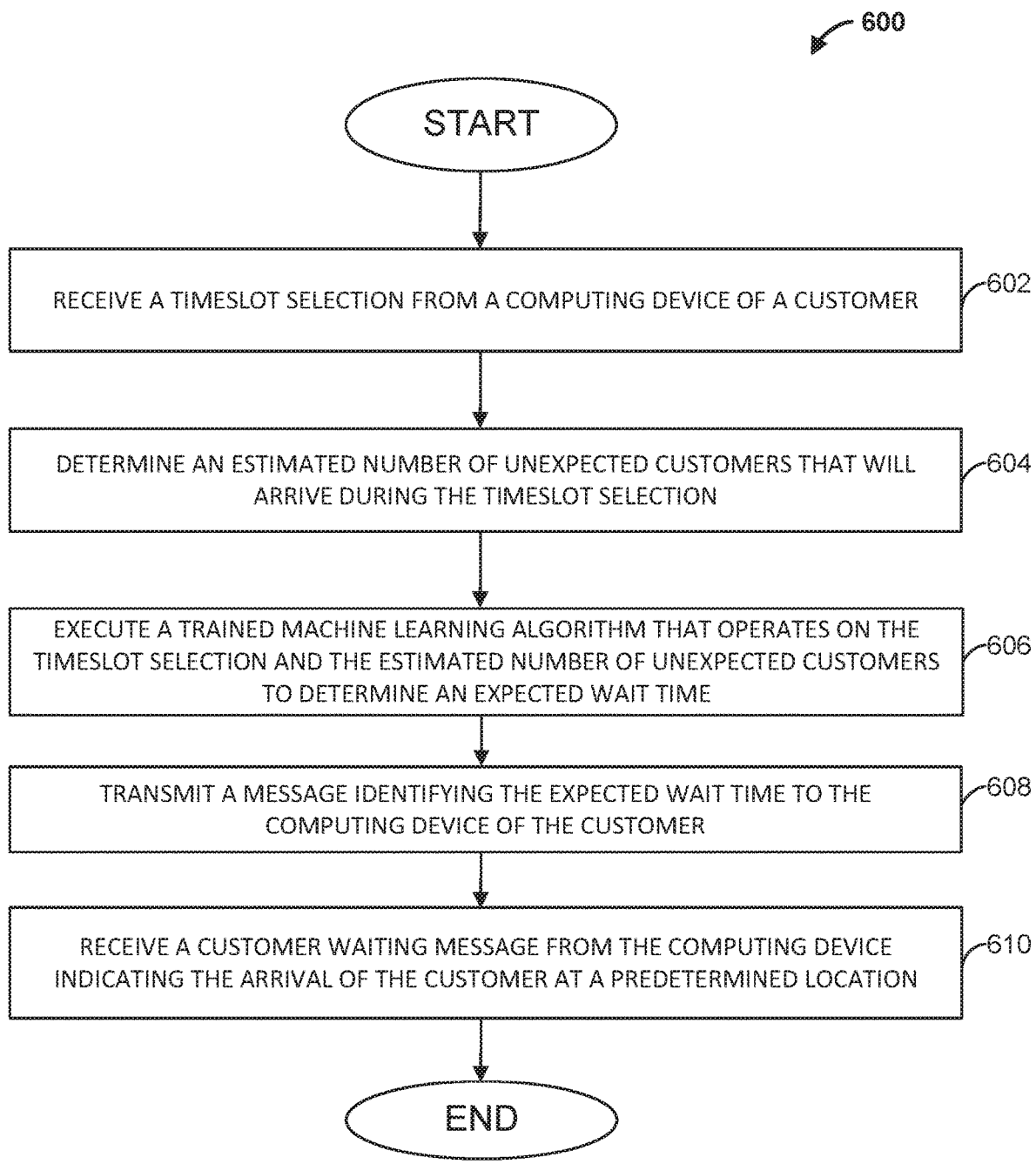
FIG. 6 is a flowchart of another example method that can be carried out by the wait time determination server of FIG. 1 in accordance with some embodiments.

FIG. 6 is a flowchart of an example method 600 that can be carried out by a server, such as wait time determination server 102 of FIG. 1. Beginning at step 602, a timeslot selection is received from a computing device of a customer. The timeslot selection indicates a window of time during which a customer will arrive at a predetermined location to pick up purchased items. At step 604, an estimated number of unexpected customers that will arrive during the timeslot selection is determined. For example, unexpected customer determination engine 314 may execute a machine learning algorithm based on the selected timeslot to determine the number of unexpected customers.

Proceeding to step 606, a trained machine learning algorithm is executed to determine an estimated wait time for the customer. The machine learning algorithm operates on the timeslot selection and the number of unexpected customers. The machine learning algorithm may be based on XGBoost regression, for example. Proceeding to step 608, a message is transmitted to the computing device of the customer. The message indicates the estimated wait time. At step 610, a customer waiting message is received from the computing device of the customer. The customer waiting message indicates that the customer has arrived at a predetermined location. The customer waiting message may be received, for example, during the selected timeslot (e.g., the customer arrived at the predetermined location during the selected timeslot). The customer waiting message may also indicate, in some examples, a parking location and a vehicle color for the customer's vehicle.

Figure 7:
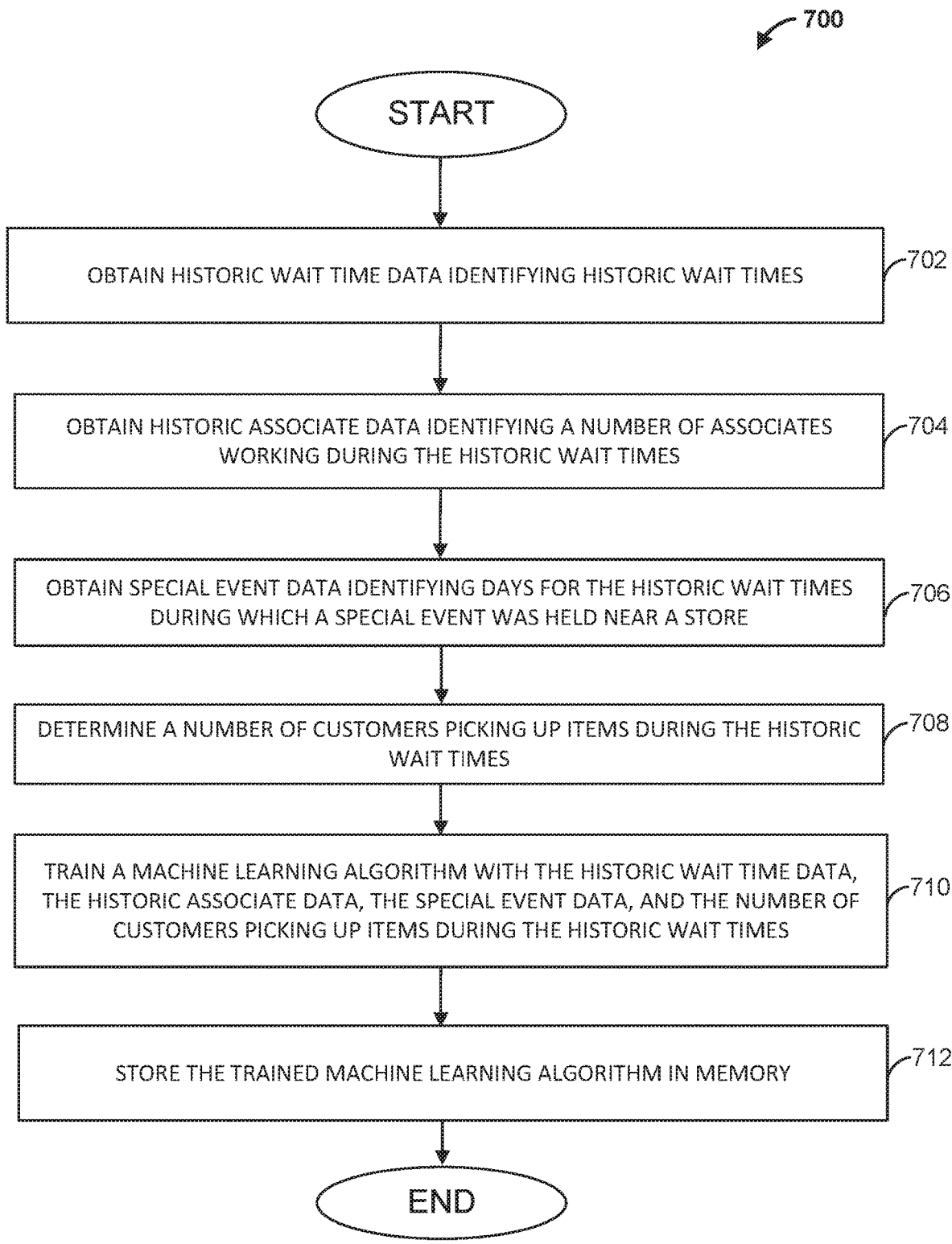
FIG. 7 is a flowchart of yet another example method that can be carried out by the wait time determination server of FIG. 1 in accordance with some embodiments.

FIG. 7 is a flowchart of an example method for training a machine learning algorithm that can be carried out by a server, such as wait time determination server 102 of FIG. 1. Beginning at step 702, historic wait time data is obtained. The historic wait time data includes actual wait times for a same store on the same day over a previous period of time, such as last week, last month, last year, etc. The historic wait times may also identify actual wait times for a current period of time, such as this week, this month, etc.

At step 704, historic associate data is obtained. Historic associate data includes a number of associates working during the wait times of step 702. At step 706, special event data is obtained. The special event data may identify days for the wait times of step 702 on which special events were held near a store. At step 708, a number of customers picking up items during the wait times of step 702 are determined. For example, wait time determination server 102 may determine how many customers picked up orders during the actual wait times of step 702.

Proceeding to step 710, a machine learning algorithm is trained with the historic wait time data, historic associate data, special event data, and the number of customers picking up items during the wait times. The machine learning algorithm may be, for example, one based on XGBoost. At step 712, the trained machine learning algorithm is stored in memory. For example, the machine learning algorithm may be stored in instruction memory 207 of FIG. 2.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable (e.g., computer-readable) storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
a first computing device communicatively coupled to a second computing device, wherein the first computing device is configured to:
receive first data identifying an arrival time window of a customer from the second computing device;
determine a current time based on the received first data;
determine a first number of customers waiting for service;
determine a first number of associates available to assist the first number of customers;
determine an estimated number of unexpected customers that may arrive during the arrival time window based on historical data, the historical data identifying numbers of unexpected customers during a same arrival time window for previous periods of time;
determine an expected wait time for the customer based on the current time, the first number of customers waiting for service, the estimated number of unexpected customers that may arrive during the arrival time window, and the first number of associates available; and
transmit the expected wait time to the second computing device.

2. The system of claim 1, wherein determining the expected wait time comprises applying at least one machine learning process to the current time, the first number of customers waiting for service, and the first number of associates available.

3. The system of claim 2, wherein the at least one machine learning process is based on XGBoost.

4. The system of claim 1, wherein the first computing device is configured to:
determine at least one historic wait time corresponding to the arrival time window over a previous period of time;
determine a second number of customers waiting for service during the at least one historic wait time;
determine a second number of associates available during the at least one historic wait time; and
determine the expected wait time for the customer based on the at least one historic wait time, the second number of customers, and the second number of associates.

5. The system of claim 1, wherein the second computing device is configured to display the expected wait time.

6. The system of claim 1, wherein the second computing device is configured to:
receive the expected wait time;
determine whether the expected wait time is beyond a threshold;
display a first screen if the expected wait time is beyond the threshold; and
display a second screen if the expected wait time is not beyond the threshold.

7. The system of claim 6, wherein the first screen identifies the expected wait time.

8. The system of claim 1, wherein the second computing device is configured to:
receive the expected wait time;
display a screen in response to receiving the expected wait time; and
in response to displaying the screen:
receive a first input identifying a parking location for the customer; and
transmit the parking location to the first computing device.

9. The system of claim 1, wherein the second computing device is configured to:
receive the expected wait time;
display a screen in response to receiving the expected wait time; and
in response to displaying the screen:
receive a first input identifying a vehicle color for the customer; and
transmit the vehicle color to the first computing device.

10. A method comprising:
receiving first data identifying an arrival time window of a customer from a second computing device;
determining a current time based on the received first data;
determining a first number of customers waiting for service;
determining a first number of associates available to assist the first number of customers;

determine an estimated number of unexpected customers that may arrive during the arrival time window based on historical data, the historical data identifying numbers of unexpected customers during a same arrival time window for previous periods of time;

determining an expected wait time for the customer based on the current time, the first number of customers waiting for service, the estimated number of unexpected customers that may arrive during the arrival time window, and the first number of associates available; and transmitting the expected wait time to the second computing device.

11. The method of claim 10, wherein determining the expected wait time comprises applying at least one machine learning process to the current time, the first number of customers waiting for service, and the first number of associates available.

12. The method of claim 11, wherein the at least one machine learning process is based on XGBoost.

13. The method of claim 10, further comprising:
determining at least one historic wait time corresponding to the arrival time window over a previous period of time;
determining a second number of customers waiting for service during the at least one historic wait time;
determining a second number of associates available during the at least one historic wait time; and
determining the expected wait time for the customer based on the at least one historic wait time, the second number of customers, and the second number of associates.

14. A non-transitory, computer-readable storage medium comprising executable instructions that, when executed by one or more processors, cause the one or more processors to:
receive first data identifying an arrival time window of a customer from a second computing device;
determine a current time based on the received first data;
determine a first number of customers waiting for service;
determine a first number of associates available to assist the first number of customers;
determine an estimated number of unexpected customers that may arrive during the arrival time window based on historical data, the historical data identifying numbers of unexpected customers during a same arrival time window for previous periods of time;
determine an expected wait time for the customer based on the current time, the first number of customers waiting for service, the estimated number of unexpected customers that may arrive during the arrival time window, and the first number of associates available; and
transmit the expected wait time to the second computing device.

15. The non-transitory computer-readable storage medium of claim 14 wherein the executable instructions, when executed by the one or more processors, cause the one or more processors to determine the expected wait time by applying at least one machine learning process to the current time, the first number of customers waiting for service, and the first number of associates available.

16. The non-transitory computer-readable storage medium of claim 14 wherein the executable instructions, when executed by the one or more processors, cause the one or more processors to:
determine at least one historic wait time corresponding to the arrival time window over a previous period of time;
determine a second number of customers waiting for service during the at least one historic wait time;
determine a second number of associates available during the at least one historic wait time; and
determine the expected wait time for the customer based on the at least one historic wait time, the second number of customers, and the second number of associates.

17. The non-transitory computer-readable storage medium of claim 14 wherein the executable instructions, when executed by the one or more processors, cause the one or more processors to determine the estimated number of unexpected customers by applying a machine learning process to the historical data identifying numbers of customers arriving unexpectedly during the previous periods of time.

* * * * *